US010826768B2

(12) United States Patent
Britt et al.

(10) Patent No.: US 10,826,768 B2
(45) Date of Patent: Nov. 3, 2020

(54) CONTROLLED NODE CONFIGURATION

(71) Applicant: HEWLETT PACKARD ENTERPRISE DEVELOPMENT LP, Houston, TX (US)

(72) Inventors: Julie Britt, Roseville, CA (US); Anuradha Musunuri, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 145 days.

(21) Appl. No.: 15/300,268

(22) PCT Filed: Mar. 28, 2014

(86) PCT No.: PCT/US2014/032121
§ 371 (c)(1),
(2) Date: Sep. 28, 2016

(87) PCT Pub. No.: WO2015/147850
PCT Pub. Date: Oct. 1, 2015

(65) Prior Publication Data
US 2017/0141962 A1 May 18, 2017

(51) Int. Cl.
*H04L 12/24* (2006.01)
*G06F 9/50* (2006.01)
(Continued)

(52) U.S. Cl.
CPC ........ *H04L 41/0873* (2013.01); *G06F 9/5072* (2013.01); *H04L 41/046* (2013.01);
(Continued)

(58) Field of Classification Search
CPC ... H04L 41/0873; H04L 67/34; H04L 41/046; H04L 67/10; H04L 41/085; H04L 41/0893; H04L 67/42; G06F 9/5072
See application file for complete search history.

(56) References Cited

U.S. PATENT DOCUMENTS 7,263,070 B1 * 8/2007 Delker ............. H04L 29/12207
370/254
8,225,057 B1 * 7/2012 Zheng ................. G06F 11/1458
711/114
(Continued)

FOREIGN PATENT DOCUMENTS

WO WO-2014/003700 A1 1/2014

OTHER PUBLICATIONS

International Search Report and Written Opinion, International Application No. PCT/US2014/032121, dated Nov. 28, 2014, pp. 1-8, KIPO.

(Continued)

*Primary Examiner* — Chris Parry
*Assistant Examiner* — Steven C Nguyen
(74) *Attorney, Agent, or Firm* — Brooks, Cameron & Huebsch, PLLC

(57) ABSTRACT

Controlled node configuration includes managing a plurality of configurations of a plurality of controlled nodes using a cloud controller. Additionally, controlled node configuration not only monitors inconsistencies if any, present in the plurality of configurations of the controlled nodes but also sends the plurality of managed configurations to them.

18 Claims, 4 Drawing Sheets

(51) Int. Cl.
*H04L 29/08* (2006.01)
*H04L 29/06* (2006.01)

(52) U.S. Cl.
CPC ........ *H04L 41/085* (2013.01); *H04L 41/0893* (2013.01); *H04L 67/10* (2013.01); *H04L 67/34* (2013.01); *H04L 67/42* (2013.01)

(56) References Cited

U.S. PATENT DOCUMENTS

| | | |
|---|---|---|
| 2011/0023044 A1* | 1/2011 | Krutyolkin ........... G06F 9/4881 718/102 |
| 2011/0310894 A1 | 12/2011 | Karino |
| 2012/0227037 A1 | 9/2012 | Sen-Feng |
| 2012/0311111 A1* | 12/2012 | Frew ..................... G06F 9/5072 709/221 |
| 2013/0268686 A1 | 10/2013 | Wang et al. |
| 2014/0006465 A1 | 1/2014 | Davis et al. |
| 2014/0016474 A1 | 1/2014 | Beheshti-Zavareh et al. |
| 2014/0040438 A1 | 2/2014 | Donahue et al. |
| 2014/0047081 A1 | 2/2014 | Edwards |
| 2015/0271014 A1* | 9/2015 | Madama ............. H04L 41/0893 709/222 |

OTHER PUBLICATIONS

Kevin Phemius et al.; "DISCO: Distributed Multi-domain SDN Controllers," Aug. 29, 2013, pp. 1-8, Available at: <hal.archives-ouvertes.fr/docs/00/85/51/58/PDF/DISCO_-_Distributed_SDN_Controllers_under_submission_.pdf>.

* cited by examiner

CONTROLLED NODE CONFIGURATION

BACKGROUND

A cloud deployment consists of physical and virtual elements. A physical network element such as a switch or a router can be virtualized by running a network service software module on a server or in a virtual machine. These virtual network services must adhere to a configuration consistent with the other elements in the cloud, both physical and virtual.

DETAILED DESCRIPTION

Software Defined Networking (SDN) is an emerging network architecture where network control is decoupled from forwarding and is directly programmable. This migration of control, formerly tightly bound in individual network devices, into accessible computing devices enables the underlying infrastructure to be abstracted for applications and network services, which can treat the network as a logical or virtual entity.

An SDN network consists of multiple virtual elements (e.g., physical networks, servers, virtual machines, agents, etc.) that may need to be configured based on customer needs. Configuring each possible attribute for each element in the SDN network can be a very time-consuming and laborious process when there are a large number of virtual elements and/or users in the SDN network. Furthermore, administrators of an SDN network may need to ensure that the configurations of all the different SDN network elements are consistent and easily managed. Having to individually configure each SDN network element independent of the others can cause inconsistencies or inefficiencies and result in errors that are likely to affect the users of the SDN network.

Some mechanisms to achieve a consistent configuration across multiple network elements use a generic configuration tool that allows an administrator to define files and/or packages to download to any physical server in the network. With these mechanisms, even though the configuration files are centralized, the management of them is still manual and specific to each server.

In contrast, in accordance with examples of the present disclosure, a dynamic configuration tool embedded in a cloud controller (e.g., an SDN controller) can provide configurations defined by an administrator to each server within the cloud without manual configuration of each server. Similarly, examples of the present disclosure provide that the dynamic configuration tool can manage configurations across all servers within the cloud, determining whether a configuration for one server affects or is affected by, a configuration of another server. Further, central management of configurations by the dynamic configuration tool provides an efficient mechanism to ensure consistent configurations are implemented in the cloud.

Figure 1:
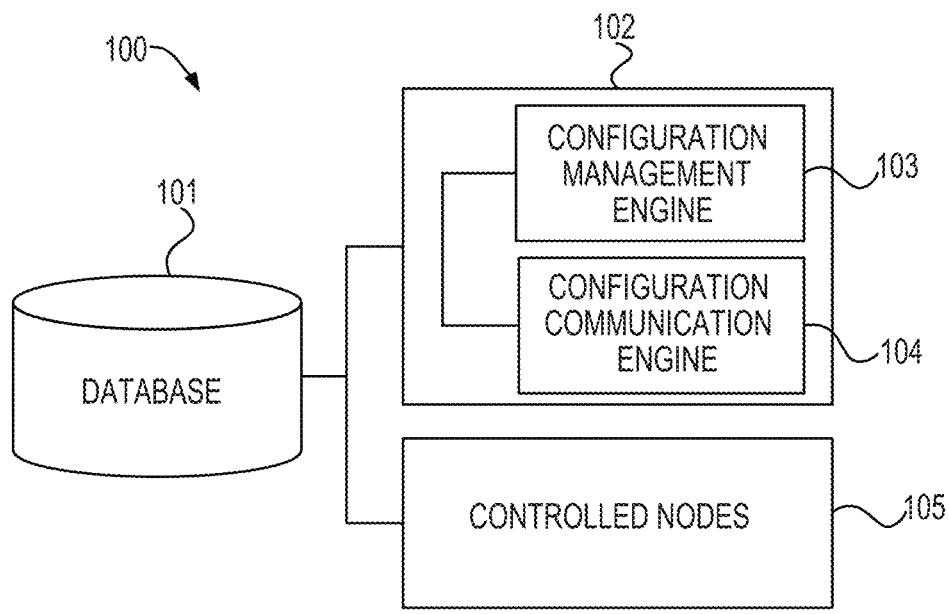
FIG. 1 illustrates a diagram of an example of a system for controlled node configuration according to the present disclosure.
Figure 2:
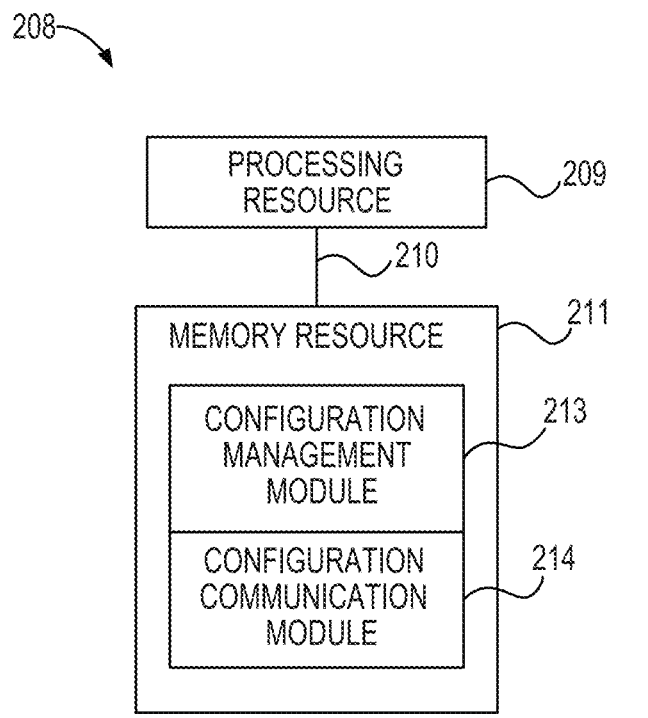
FIG. 2 illustrates a diagram of an example computing device according to the present disclosure.

FIGS. 1 and 2 illustrate examples of systems 100, 208 according to the present disclosure. FIG. 1 illustrates a diagram of an example of a system 100 for controlled node configuration according to the present disclosure. The system 100 can include a database 101, a cloud controller 102, a number of engines 103, 104, and/or a number of controlled nodes 105. As used herein, a controlled node refers to a node that is controlled by a cloud controller. The cloud controller 102 can be in communication with the database 101 and the controlled nodes 105, and/or a stream application programming interface (API) via a communication link. Further, the cloud controller 102 can include a number of engines (e.g., configuration management engine 103 and configuration communication engine 104). The cloud controller 102 can include additional or fewer engines than illustrated to perform the various functions described herein.

The number of engines 103, 104 can include a combination of hardware and programming that is configured to perform a number of functions described herein (e.g., manage a plurality of configurations of the plurality of controlled nodes). The programming can include program instructions (e.g., software, firmware, etc.) stored in a memory resource (e.g., computer readable medium (CRM), machine readable medium (MRM), etc.) as well as hard-wired program (e.g., logic).

In some examples, a cloud controller 102 can include a combination of hardware and programming that is configured to perform the functions of a dynamic configuration tool. As used herein a dynamic configuration tool can include a combination of hardware and programming to manage and communicate configuration information (e.g., configurations) to a plurality of controlled nodes (e.g., controlled nodes 105). As used herein, configurations refer to global settings, defined by a configuration object, that define how the cloud controller 102 communicates with devices and/or administrators within the cloud. Configurations can be controller specific, in that configurations pertain to only one cloud controller. In some examples, configurations can include a media access control organizational unique identifier (MAC OUI) which specifies the first three bytes to be used for assigning MAC addresses to virtual ports in the cloud. Configurations can also include a tenant network type, which defines the type of network that the tenant (e.g., user) will be using. That is, a tenant network type can describe how virtual elements running on a controlled node will map to a physical network. Examples of a tenant network type can include a virtual local area network (VLAN), a generic routing encapsulation (GRE), and a virtual extensible local area network (VXLAN), however, examples are not so limited and a tenant network type can include any network type that describes how the controlled node maps to a physical network. Also, configurations can include a definition of a physical network. A physical network configuration can include an identification of a data network that connects tenant-created (e.g., user-created) components in the network (e.g., all tenant-created components in the network), such as virtual machines (VMs), virtual interfaces, and virtual routers. The data network can be identified by a unique identifier, such as a unique name and/or number supplied by a cloud administrator. This unique identifier maps to a specific connection point on the controlled node linking the virtual elements to the physical data. The physical network configuration could be an identification of an external network that represents the physical linkage to the public network outside the private cloud. The external network can be identified by a bridge name, such as an OVS bridge name.

For example, the dynamic configuration tool can maintain a list of configurations used in the cloud, as well as information about components included in the cloud. The dynamic configuration tool can use the maintained configurations to send configurations to controlled nodes. For example, when a new controlled node joins the cloud, the dynamic configuration tool can send maintained configurations to the new controlled node. Further, the dynamic configuration tool can use the maintained configurations to change and/or add configurations stored in each of the controlled nodes. For instance, when an administrator changes configurations used in the cloud, the dynamic configuration tool can send the changed configurations to all controlled nodes known by the cloud controller. Additionally, the dynamic configuration tool can use the maintained configurations to check and/or verify whether new and/or additional configurations provided by a cloud administrator are acceptable (e.g., whether the new and/or different configurations are incompatible with existing configurations stored in each controlled node). In some examples, rather than storing configurations itself, the dynamic configuration tool can access a list of configurations maintained by a different cloud component.

The configuration management engine 103 can include hardware and/or a combination of hardware and programming to manage a plurality of configurations of a plurality of controlled nodes and check for inconsistencies in the plurality of configurations of the plurality of controlled nodes. For instance, the configuration management engine 103 can check for inconsistencies between configurations provided by a cloud administrator and a joining node, wherein a joining node includes a node attempting to connect to the cloud controller 102. Similarly, the configuration management engine 103 can check for inconsistencies between configurations provided by a cloud administrator, and configurations stored by agents in the controlled nodes. In some examples, the plurality configurations can be managed by a dynamic configuration tool embedded in the cloud controller 102. For example, the configuration management engine 103 can maintain a backup of the plurality of configurations in order to restore configurations for the plurality of nodes to a prior date and/or setting. Furthermore, the configuration management engine 103 can maintain a list of configurations based on properties of physical servers. In some examples, the configuration management engine 103 can group similar configurations based on internet protocols (IPs) or hostnames of physical servers.

The configuration communication engine 104 can include hardware and/or a combination of hardware and programming to communicate the plurality of managed configurations from the configuration management engine to a plurality of controlled nodes, in response to the cloud controller amending the plurality of configurations of the plurality of controlled nodes. As used herein, amending the plurality of configurations can include changing an existing configuration stored by the plurality of controlled nodes, adding new configurations stored by the plurality of controlled nodes, and/or adding joining nodes to the cloud. In some examples, the plurality of managed configurations can be communicated to the plurality of controlled nodes by the dynamic configuration tool embedded in the cloud controller 102. The configuration communication engine 104 can check for consistency between configurations to make sure that what is being used by the cloud controller 102 to create virtual elements does not conflict with what will be sent to the agents to set up their cloud services. Also, the configuration communication engine 104 can send (e.g., push) configurations to any agents known by the controller. As used herein, an agent refers to a component of a controlled node that relays messages between the cloud controller 102 and the controlled node. An agent can be known by the controller if it is registered in a database maintained by the cloud controller 102, or otherwise available for management.

FIG. 2 illustrates a diagram of an example computing device 208 according to the present disclosure. The computing device 208 can utilize software, hardware, firmware, and/or logic to perform a number of functions described herein. The computing device 208 can be any combination of hardware and program instructions configured to share information. The hardware, for example, can include a processing resource 209 and/or a memory resource 211 (e.g., CRM, MRM, database, etc.). A processing resource 209, as used herein, can include any number of processors capable of executing instructions stored by a memory resource 211. Processing resource 209 may be implemented in a single device or distributed across multiple devices. The program instructions (e.g., computer readable instructions (CRI)) can include instructions stored on the memory resource 211 and executable by the processing resource 209 to implement a desired function (e.g., manage a plurality of configurations of a plurality of controlled nodes).

The memory resource 211 can be in communication with a processing resource 209. A memory resource 211, as used herein, can include any number of memory components capable of storing instructions that can be executed by processing resource 209. Such memory resource 211 can be a non-transitory CRM or MRM. Memory resource 211 may be integrated in a single device or distributed across multiple devices. Further, memory resource 211 may be fully or partially integrated in the same device as processing resource 209 or it may be separate but accessible to that device and processing resource 209. Thus, it is noted that the computing device 208 may be implemented on a participant device, on a server device, on a collection of server devices, and/or a combination of the user device and the server device.

The memory resource 211 can be in communication with the processing resource 209 via a communication link (e.g., a path) 210. The communication link 210 can be local or remote to a machine (e.g., a computing device) associated with the processing resource 209. Examples of a local communication link 210 can include an electronic bus internal to a machine (e.g., a computing device) where the memory resource 211 is one of volatile, non-volatile, fixed, and/or removable storage medium in communication with the processing resource 209 via the electronic bus.

A number of modules 213, 214 can include CRI that when executed by the processing resource 209 can perform a number of functions. The number of modules 213, 214 can be sub-modules of other modules. For example, the configuration management module 213 and the configuration communication module 214 can be sub-modules and/or contained within the same computing device. In another example, the number of modules 213, 214 can comprise individual modules at separate and distinct locations (e.g., CRM, etc.).

Each of the number of modules 213, 214 can include instructions that when executed by the processing resource 209 can function as a corresponding engine as described herein. For example, the configuration management module 213 can include instructions that when executed by the processing resource 209 can function as the configuration management engine 103. In another example, the configuration communication module 214 can include instructions that when executed by the processing resource 209 can function as the configuration communication engine 104.

Figure 3:
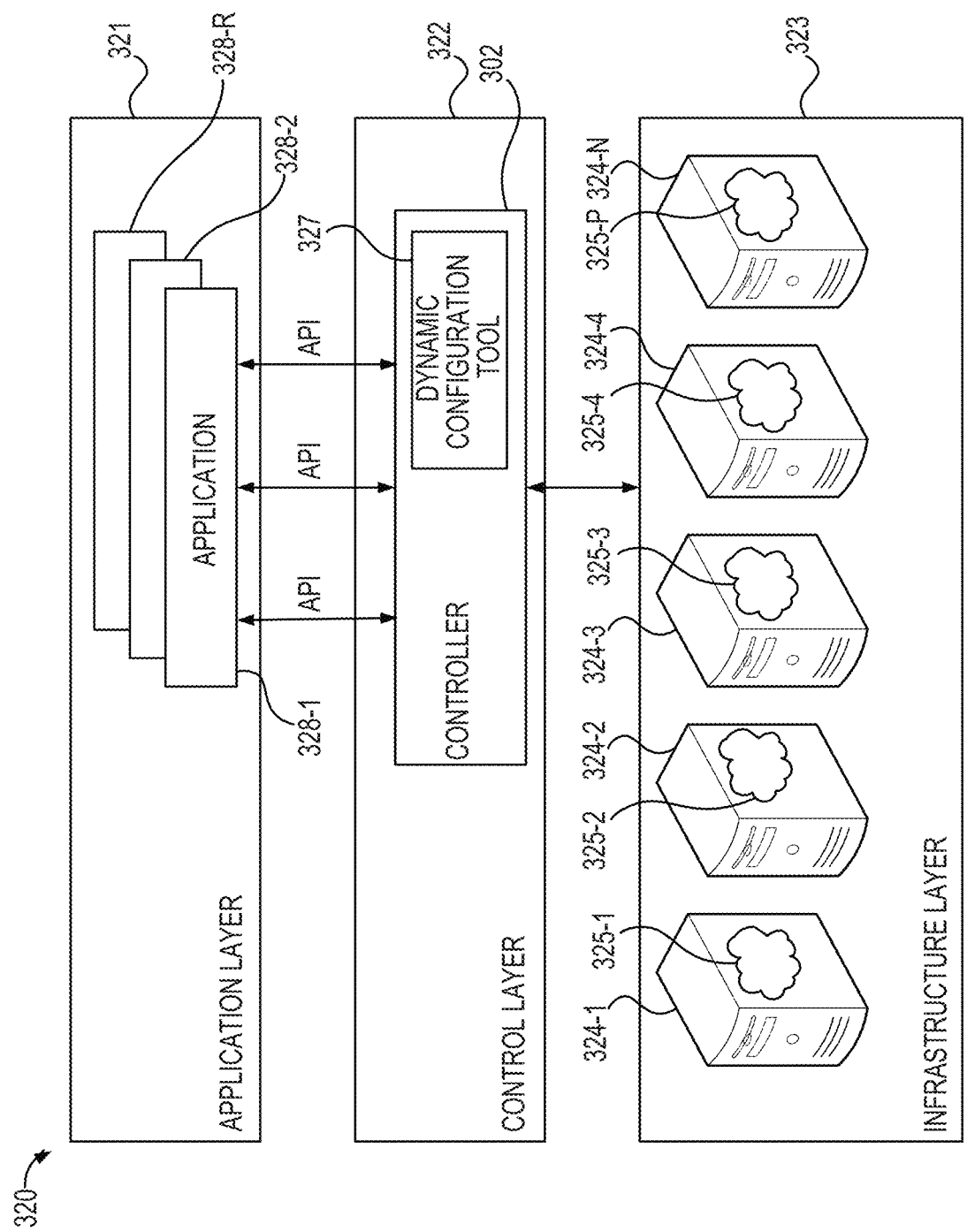
FIG. 3 illustrates an environment for controlled node configuration according to the present disclosure.

FIG. 3 illustrates an environment 320 for controlled node configuration according to the present disclosure. The environment 320 can include a cloud that allows end recipient computer systems (e.g., thin clients, portable computers, smartphones, desktop computers, etc.) to access a pool of hosted computing and/or storage resources (e.g., the cloud resources) and virtual network services over a physical network (e.g., a private intranet and/or the public Internet). In some examples, the environment 320 can include an SDN. An SON can include a form of cloud virtualization in which a control layer 322 (e.g., a sub-system that makes decisions that affect cloud traffic) is separated from an infrastructure layer 323 and is implemented as software. The control layer 322 can define how cloud traffic is handled (e.g., via protocols) in a number of devices.

As illustrated in FIG. 3, the environment 320 can include an application layer 321, a control layer 322, and/or an infrastructure layer 323. The application layer 321 can include a number of applications (e.g., programs) 328-1, 328-2, . . . , 328-R that communicate cloud requirements and/or desired cloud behavior to the control layer 322. The application layer 321 can communicate with the control layer 322 via an application programming interface (API). As used herein, an API can include a set of routines, protocols, and/or tools that accomplish a specific task and/or are allowed to interact with a specific software component. In some examples, the application layer 321 can communicate with the control layer 322 via a representation state transfer (REST)ful API. REST can include an architectural style that abstracts architectural elements within a distributed hypermedia system that ignores the details of component implementation and protocol syntax in order to focus on the roles of components, the constraints upon interaction with other components, and interpretation of significant data elements. A RESTful API can include a web API implemented using hypertext transfer protocol (HTTP) and REST principles as a collection of resources. However, examples are not so limited, and the application layer 321 can communicate with the control layer 322 using other APIs and/or protocols.

The control layer 322 can translate requirements provided by the application layer 321 to the infrastructure layer 323. Further, the control layer 322 can include a controller (e.g., a cloud controller) 302 to communicate between the application layer 321 and the infrastructure layer 323. The cloud controller 302 can be hardware and/or software. A hardware cloud controller 302 can include a processing resource in communication with a memory resource. The memory resource can include a set of instructions, executable by the processing resource to perform a number of functions described herein. In some examples, the cloud controller 302 can be a discrete device, such as a server. In some examples, the cloud controller 302 can be a distributed cloud controller, for example, such as a cloud-provided functionality.

Also, as illustrated in FIG. 3, the environment 320 can include a dynamic configuration tool 327 embedded in the controller 302, and a number of controlled nodes 324-1, 324-2, 324-3, 324-4, . . . , 324-N (hereinafter referred to as controlled nodes 324). The dynamic configuration tool 327 can include hardware and/or software to dynamically configure the number of controlled nodes 324. As used herein, dynamic configuration refers to the act of sending configurations to a number of controlled nodes 324 simultaneously and/or substantially simultaneously when configurations are added and/or changed. Further, dynamic configuration can refer to sending configurations to a number of controlled nodes 324 when a new (e.g., not previously configured) controlled node joins the cloud. In contrast to dynamic configuration, static configuration requires that the configurations of each controlled node 324 be manually changed (e.g. updated) and/or added when necessary. That is, with static configuration, configurations for each controlled node (e.g., controlled nodes 324-1, 324-2, 324-3, 324-4, . . . , 324-N) must be entered independent from one another.

Each of the number of controlled nodes 324 can include a number of agents. As used herein, an agent refers to a component of a controlled node (e.g., controlled node 324-1) that relays messages between the cloud controller 302 and the controlled node and performs a specific virtual network service. For example, each of the number of controlled nodes 324 can include an agent that performs the services of at least one of an IP address agent, a switching agent, and/or a routing agent. Multiple instances of these agents could be running on each controlled node, however, each agent can be connected to only one cloud controller 302. When providing configurations to each of the number of controlled nodes 324, the cloud controller 302 can send (e.g., push) configurations to the agents residing on each of the number of controlled nodes 324.

Also, each of the number of controlled nodes 324 can include a VM 325-1, 325-2, 325-3, 325-4, . . . , 325-N (hereinafter referred to as VMs 325). A VM can be a software implementation of a machine that executes programs like a physical machine. For instance, VM 325-1 can be a software implementation of controlled node 324-1, and can execute programs like controlled node 324-1. Using the dynamic configuration tool 327, the controller 302 can push configurations to controlled nodes 324 and/or VMs 325.

Figure 4:
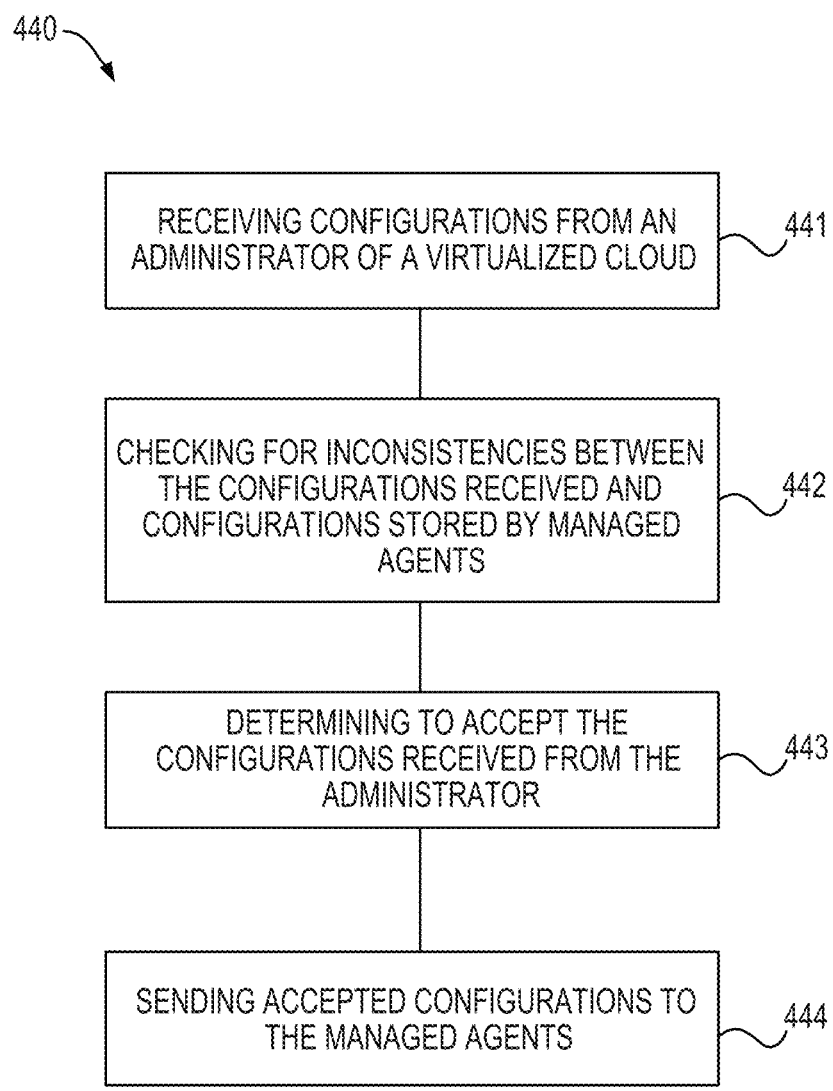
FIG. 4 illustrates a flow chart of a method for controlled node configuration according to the present disclosure.

FIG. 4 illustrates a flow chart of a method 440 for controlled node configuration according to the present disclosure. At 441, the method 440 can include receiving, by a dynamic configuration tool embedded in a cloud controller, configurations from an administrator of a virtualized cloud. As described in relation to FIG. 3, a cloud can include a virtualized cloud that allows end recipient computer systems to access a pool of hosted computing and/or storage resources and virtual network services over a physical network. In some examples, the virtualized cloud can include an SDN. Further, as described in relation to FIGS. 1-3, the dynamic configuration tool can be embedded in the cloud controller. The dynamic configuration tool can include software and/or hardware to both manage a plurality of configurations of a plurality of nodes in the virtualized cloud. In some examples, the plurality of nodes can include physical servers (e.g., physical computing devices) and/or VMs. For instance, the dynamic configuration tool can maintain a backup of configurations stored on a plurality of physical servers and VMs in order to restore the virtual cloud to a prior date and/or configuration. As described further herein, the dynamic configuration tool can send (e.g., push and/or communicate) configurations provided by the administrator to agents residing on each of the plurality of nodes within the virtualized cloud.

At 442, the method 440 can include checking, using the dynamic configuration tool, for inconsistencies between the configurations received from the administrator and configurations stored by managed agents in the virtualized cloud, wherein managed agents include agents registered with the dynamic configuration tool. An inconsistent configuration can include a configuration that is impossible and/or inefficient for implementation within the virtualized cloud. For example, an inconsistent configuration can include a configuration provided by an administrator, for an agent on a server to connect to a unique physical network that does not exist. Similarly, an inconsistent configuration can include a configuration for a MAC OUI for a node and provided by an administrator, that is conflicting with (e.g., not the same as) the beginning of a MAC address provided by the vendor for the node.

In some examples, the dynamic configuration tool can check for inconsistencies between configurations defined by an administrator, and configurations associated with a node attempting to connect to the cloud controller. For instance, if a node attempted to connect to the cloud controller (e.g., become a controlled node), the dynamic configuration tool can check the configurations of the joining node against the configurations input by the administrator, and identify any inconsistent configurations. In response to identifying an inconsistent configuration in the joining node, the cloud controller can accept the joining node and send an alert to the cloud administrator, or reject the joining node and not let it connect to the cloud controller. In response to rejecting a joining node, the dynamic configuration tool can send an alert to the cloud administrator identifying that the joining node was rejected and/or reasons for rejecting the joining node.

At 443, the method 440 can include determining to accept the configurations received from the administrator, based on the inconsistency check. For example, the dynamic configuration tool, embedded in the cloud controller, can determine whether an inconsistency is one that can be accepted, and whether an alert should be sent to the administrator. For example, an inconsistent configuration consisting of an administrator instructing a controlled node to utilize a MAC OUI that does not match the first three bytes of a MAC address provided by the vendor of the controlled node, can be accepted, but the dynamic configuration tool and/or the cloud controller could alert the administrator of the inconsistency. In some examples, the dynamic configuration tool can determine that an inconsistent configuration should be rejected, rather than accepted. For instance, an inconsistent configuration consisting of an administrator instructing a controlled node to connect to a unique physical network can be rejected, because such a configuration would be impossible to implement.

At 444, the method 440 can include sending accepted configurations to the managed agents for implementation in the virtualized cloud. For instance, the dynamic configuration tool and/or the cloud controller can determine that a number of configurations received from the administrator are accepted, based on the presence or absence of inconsistencies, and also determine that a number of configurations received from the administrator are rejected, also based on the presence or absence of inconsistencies. In such an example, the dynamic configuration tool and/or the cloud controller can determine to send only accepted configurations to agents operating on controlled nodes within the virtualized cloud.

In some examples, the method 440 can include checking for inconsistencies, using the cloud controller, between a plurality of cloud configurations received from an administrator of the cloud, and a plurality of configurations associated with a node attempting to connect to the cloud controller (e.g., a "joining node"). For example, a joining node can include configurations stored by an agent associated with the joining node, for a physical network (e.g., the joining node can specify that it must connect to a particular physical network), and/or a particular tenant network type.

Similarly, the method 440 can include the dynamic configuration tool, embedded in the cloud controller, determining to accept the joining node, based on the inconsistency check. In such examples, the dynamic configuration tool embedded in the cloud controller, can determine whether to accept or reject the joining node, based on the presence or absence of inconsistencies. For instance, the joining node can include configurations for physical network specifications that are incompatible with the configurations for the virtualized cloud provided by the cloud administrator. Similarly, the joining network node can include configurations for a tenant network type that is not supported by the configurations for the virtualized cloud provided by the cloud administrator. In such examples, the dynamic configuration tool can determine to reject the joining node and not connect the joining node with the cloud controller. In other examples, the dynamic configuration tool can determine that no inconsistency exists between the configurations associated with the joining node and the plurality of configurations received from the administrator. In such examples, the dynamic configuration tool can determine to accept the joining node and connect the joining node to the cloud controller. In response to connecting the joining node to the cloud controller, the dynamic configuration tool can push (e.g., send) configurations to the new controlled node (e.g., the joining node now connected to the cloud controller). For instance, the dynamic configuration tool can send a MAC OUI to the new controlled node.

Figure 5:
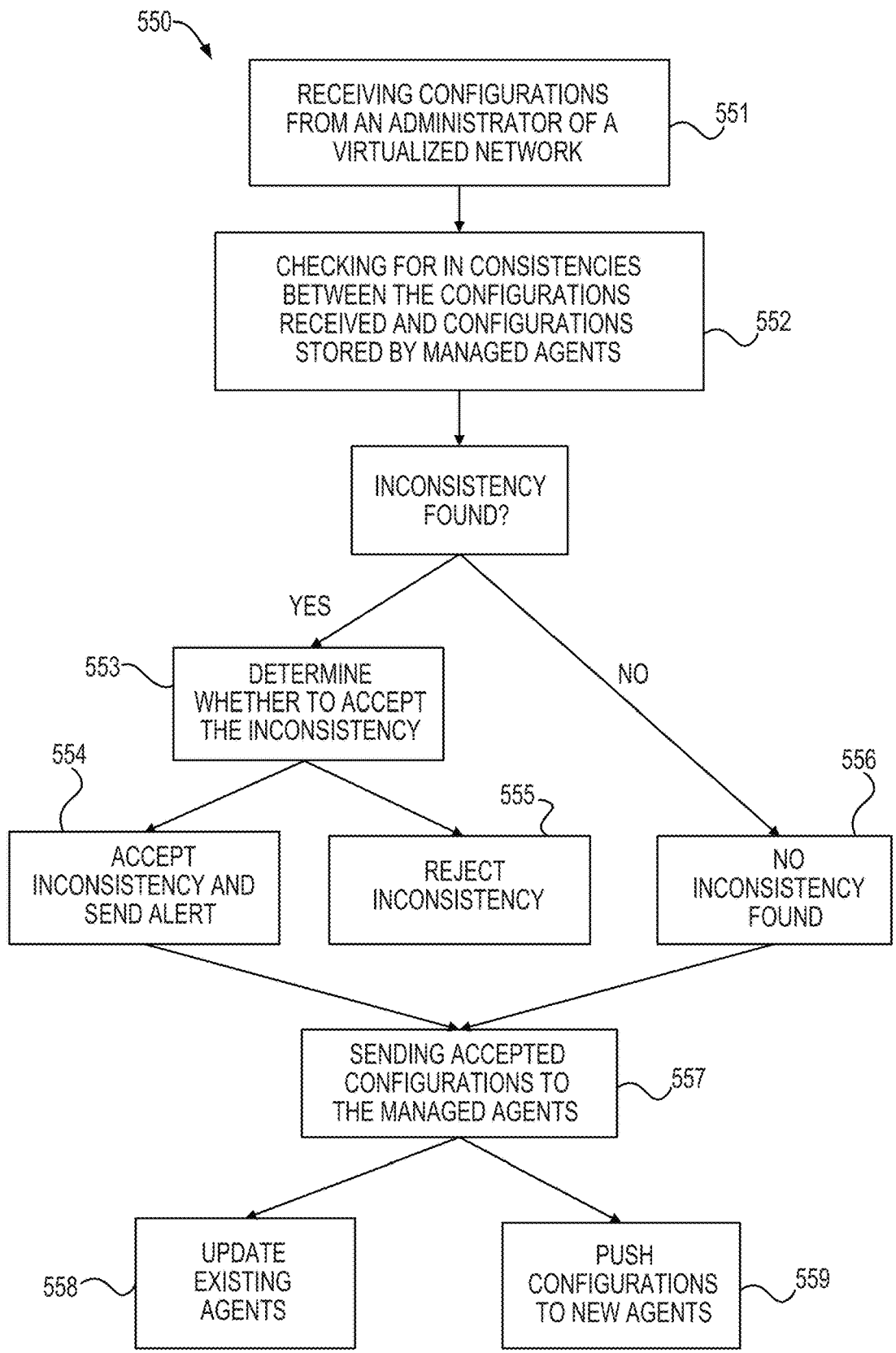
FIG. 5 illustrates a flow chart of a method for controlled node configuration according to the present disclosure.

FIG. 5 is a flow chart of a method 550 for controlled node configuration according to the present disclosure. At 551, the method 550 can include receiving, by a dynamic configuration tool embedded in a virtualized cloud controller, a plurality of configurations from an administrator of a virtualized cloud. In some examples, the plurality of configurations received from the administrator can include tenant specific configurations. A tenant specific configuration can refer to a configuration for a particular VM, such as a MAC OUI and/or a heartbeat (e.g., a periodic signal generated by the tenant and communicated to the controller to indicate normal operation and/or to synchronize other parts of the cloud). Similarly, at 552, the method 550 can include checking, using the dynamic configuration tool, for inconsistencies between the configurations received from the administrator and configurations stored by managed agents in the virtualized cloud, wherein managed agents include agents registered with the dynamic configuration tool, also as described in relation to FIG. 4. In some examples, the method 550 can include checking for inconsistencies between the configurations received and various other parameters within the virtual cloud. For example, the dynamic configuration tool can check if a physical network name provided by an administrator is compatible with physical networks included in the cloud. In another example, the dynamic configuration tool can check if a tenant network type provided by the administrator is a tenant network type that is supported by the cloud.

If an inconsistency is found, at 553 the method 550 can include determining whether to accept the inconsistency. An inconsistency between configurations received from the administrator and configurations stored by the managed agents can be undesirable, but possible, in which case the inconsistency can be accepted with an alert, and/or an inconsistency can be logistically impossible to implement in which case it can be rejected. For example, an inconsistent configuration consisting of an administrator instructing a controlled node to utilize a MAC OUI that does not match the first three bytes of a MAC address provided by the vendor of the controlled node, can be accepted, but the dynamic configuration tool and/or the cloud controller could alert the administrator of the inconsistency. In some examples, the dynamic configuration tool can determine that an inconsistent configuration should be rejected, rather than accepted. For instance, an inconsistent configuration consisting of an administrator instructing a controlled node to connect to a unique physical network can be rejected, because such a configuration would be impossible to implement.

At 554, the method 550 can include accepting the inconsistency but sending an alert to the administrator indicating why the inconsistent configuration is not recommended. For instance, in the example of an administrator instructing a controlled node to utilize a MAC OUI that does not match the first three bytes of a MAC address provided by the vendor, the administrator can be alerted of the MAC address provided by the vendor, the MAC OUI provided, and/or a statement indicating why such configuration is not recommended.

Similarly, if an inconsistency is found, at 555 the method 550 can include rejecting the inconsistent configuration and terminating the process. An example of an inconsistency between a configuration received from an administrator and configurations stored by the managed agents in the virtualized cloud that would be rejected can include an invalid input such as a mis-configured MAC OUI. A mis-configured MAC OUI could, for instance, include a negative number. Lastly, at 556, the method 550 can include the dynamic configuration tool and/or the cloud controller determining that no inconsistency is found.

At 557, the method 550 can include sending accepted configurations to the managed agents for implementation in the virtualized cloud. For example, the cloud controller and/or the dynamic configuration tool can send (e.g., push) all configurations that are inconsistent but accepted with an alert sent to the administrator, and all configurations that are not inconsistent, to managed agents within the virtualized cloud. As described further herein, managed agents can include those agents residing on nodes within the virtualized cloud that are recognized by (e.g., connected to) the cloud controller. For instance, the cloud controller can maintain a list and/or database of agents.

At 558, the method 550 can include updating existing agents either through a programmable interface or by laying down (e.g., sending) new .ini files (e.g., plain text files that contain configuration information) and telling the agent to restart and reinitialize itself. That is, if a configuration for the virtualized cloud is changing for nodes and/or agents already existing in the virtualized cloud, the cloud controller and/or the dynamic configuration tool can update those agents and/or nodes by providing the new configurations and directing the agent of the node to restart and reinitialize itself.

At 559, the method 550 can include adding new agents and/or nodes to the virtualized cloud by pushing configurations down to the new managed agents and/or nodes. For instance, as described in relation to FIG. 4, if a new node (e.g., one that was not previously configured by the cloud controller) joins the virtualized cloud, the cloud controller and/or the dynamic configuration tool can send configurations to the new agent and/or node such that when the cloud controller begins using the new agent and/or node, the new agent and/or node already includes the correct configurations.

In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, the designators "N", "P", and "R", particularly with respect to reference numerals in the drawings, indicate that a number of the particular feature and/or component so designated can be included with a number of examples of the present disclosure. The designators "N", "P", and "R" can refer to a same feature and/or component, or different features and/or components.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets. Also, as used herein, "a plurality of" something can refer to more than one of such things.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed is:

1. A system, comprising:
    a plurality of controlled nodes; and
    a cloud controller comprising:
        a processor;
        a memory to stored instructions executable by the processor;
        a configuration management engine to:
            manage a plurality of configurations based on which the plurality of controlled nodes are currently configured, wherein each configuration comprises a configuration object that defines how a controlled node subject to the configuration communicates with one or more other nodes in a network;
            receive, from a cloud administrator, an additional configuration;
            determine whether the additional configuration is in conflict with the plurality of configurations based on which the plurality of controlled nodes are currently configured; and
            in response to determining that the additional configuration is in conflict with the plurality of configurations based on which the plurality of controlled nodes are currently configured, determining whether the conflicting additional configuration is acceptable, wherein the conflicting additional configuration is determined to be acceptable if the conflicting additional configuration is possible to implement successfully despite the conflict: and a configuration communication engine configured to:
in response to the configuration management engine determining that the conflicting additional configuration is acceptable,
communicate the conflicting additional configuration to the plurality of controlled nodes.

2. The system of claim 1, wherein the plurality of controlled nodes include servers and each server includes an agent.

3. The system of claim 2, wherein the agent is one of an IP address agent, a switching agent, and a routing agent.

4. The system of claim 1, wherein the configuration management engine is to check for inconsistencies between a plurality of configurations provided by the cloud administrator and a joining node, wherein the joining node includes a node attempting to connect to the cloud controller.

5. The system of claim 1, wherein the configuration management engine is to maintain a backup of the plurality of configurations.

6. The system of claim 1, wherein the configuration management engine is to determine whether a configuration among the plurality of configurations is impossible to implement.

7. A non-transitory computer readable medium storing instructions executable by a processing resource to cause a computer to:
manage, by a cloud controller, a plurality of cloud configurations based on which a plurality of controlled nodes in a cloud are currently configured, wherein each configuration comprises a configuration object that defines how a controlled node subject to the configuration communicates with one or more other nodes in the cloud;
receive, by the cloud controller, an additional cloud configuration from an administrator of the cloud;
determine whether the additional cloud configuration is in conflict with the plurality of cloud configurations based on which the plurality of controlled nodes are currently configured;
in response to determining that the additional cloud configuration is in conflict with the plurality of configurations based on which the plurality of controlled nodes are currently configured, determining whether the conflicting additional configuration is acceptable, wherein the conflicting additional configuration is determined to be acceptable if the conflicting additional configuration is possible to implement successfully despite the conflict; and
in response to determining that the conflicting additional cloud configuration is acceptable, sending the conflicting additional cloud configuration to the plurality of controlled nodes.

8. The non-transitory computer readable medium of claim 7, wherein the cloud configurations include at least one of a MAC OUI, a tenant network type, a location for a data network and a location for an external network.

9. The non-transitory computer readable medium of claim 7, including instructions executable to group similar cloud configurations, using the cloud controller, based on IP or hostname of physical servers in the cloud.

10. The non-transitory computer readable medium of claim 7, including instructions executable to maintain as list of cloud configurations, using the cloud controller, based on properties of physical servers in the cloud.

11. The non-transitory computer readable medium of claim 7, including instructions executable to determine whether a cloud configuration among the plurality of cloud configurations is impossible to implement.

12. A method for managing configurations of a plurality of controlled nodes in a virtualized cloud, comprising:
receiving, by a dynamic configuration tool embedded in a virtualized cloud controller, a plurality of configurations from an administrator of the virtualized cloud;
checking, using the dynamic configuration tool, for an inconsistency between the plurality of configurations received from the administrator and a plurality of configurations stored by managed agents in the controlled nodes in the virtualized cloud, wherein the managed agents include agents registered with the dynamic configuration tool, and wherein each configuration comprises a configuration object that defines how a controlled node subject to the configuration communicates with one or more other nodes in a network;
in response to determining, based on the inconsistency check, that a configuration received from the administrator is in conflict with the plurality of configurations stored by the managed agents, determining whether the conflicting configuration is acceptable, wherein the conflicting additional configuration is determined to be acceptable if the conflicting additional configuration is possible to implement successfully despite the conflict; and
in response to determining that the conflicting configuration is acceptable, sending the conflicting configuration to the managed agents in the controlled nodes.

13. The method of claim 12, including identifying, by the dynamic configuration tool, an inconsistent configuration received from the administrator, accepting the inconsistent configuration, and sending an alert to the administrator indicating why the inconsistent configuration is not recommended.

14. The method of claim 12, wherein the plurality of configurations received from the administrator include configurations that are tenant specific.

15. The method of claim 12, wherein receiving configurations from the administrator includes receiving changed configurations, wherein the changed configurations were previously stored by the managed agents.

16. The method of claim 15, including updating the managed agents by sending new .ini files to the managed agents and instructing the managed agents to restart.

17. The method of claim 12, including sending the configurations received from the administrator to a new managed agent in response to the new managed agent joining the virtualized cloud.

18. The method of claim 12, wherein checking for an inconsistency includes determining whether a configuration among the plurality of configurations is impossible to implement.

* * * * *